Inventor
Siegfried Kuether
By Cushman, Darby & Cushman
Attorneys

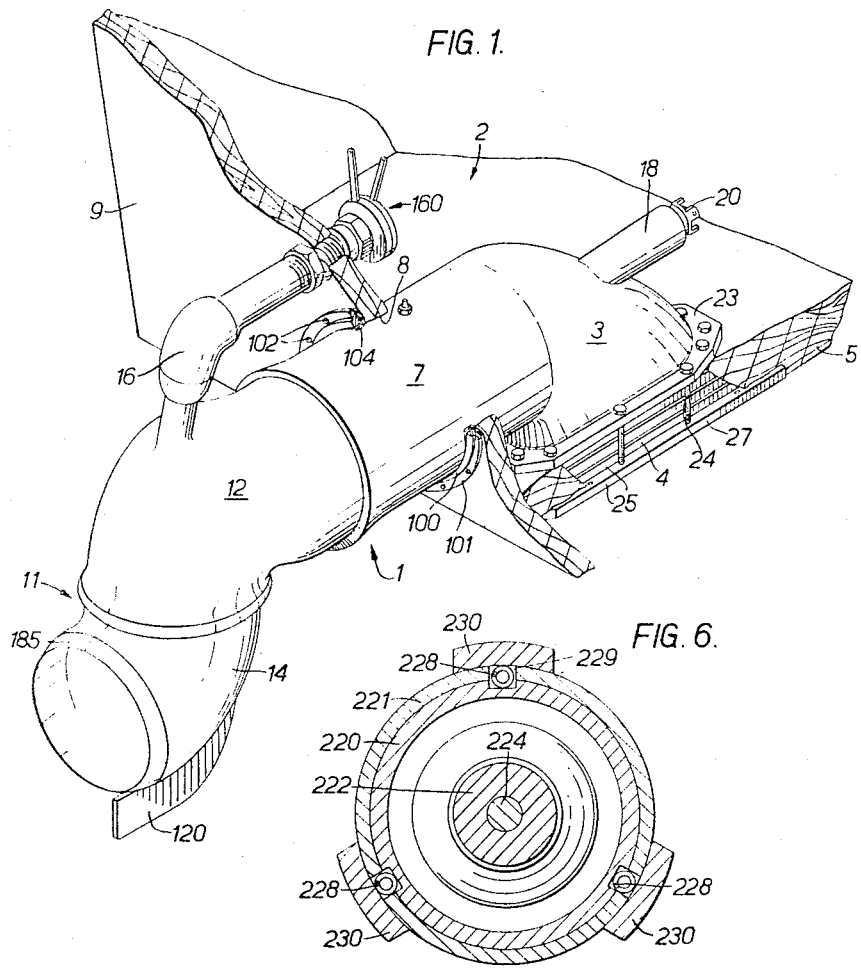

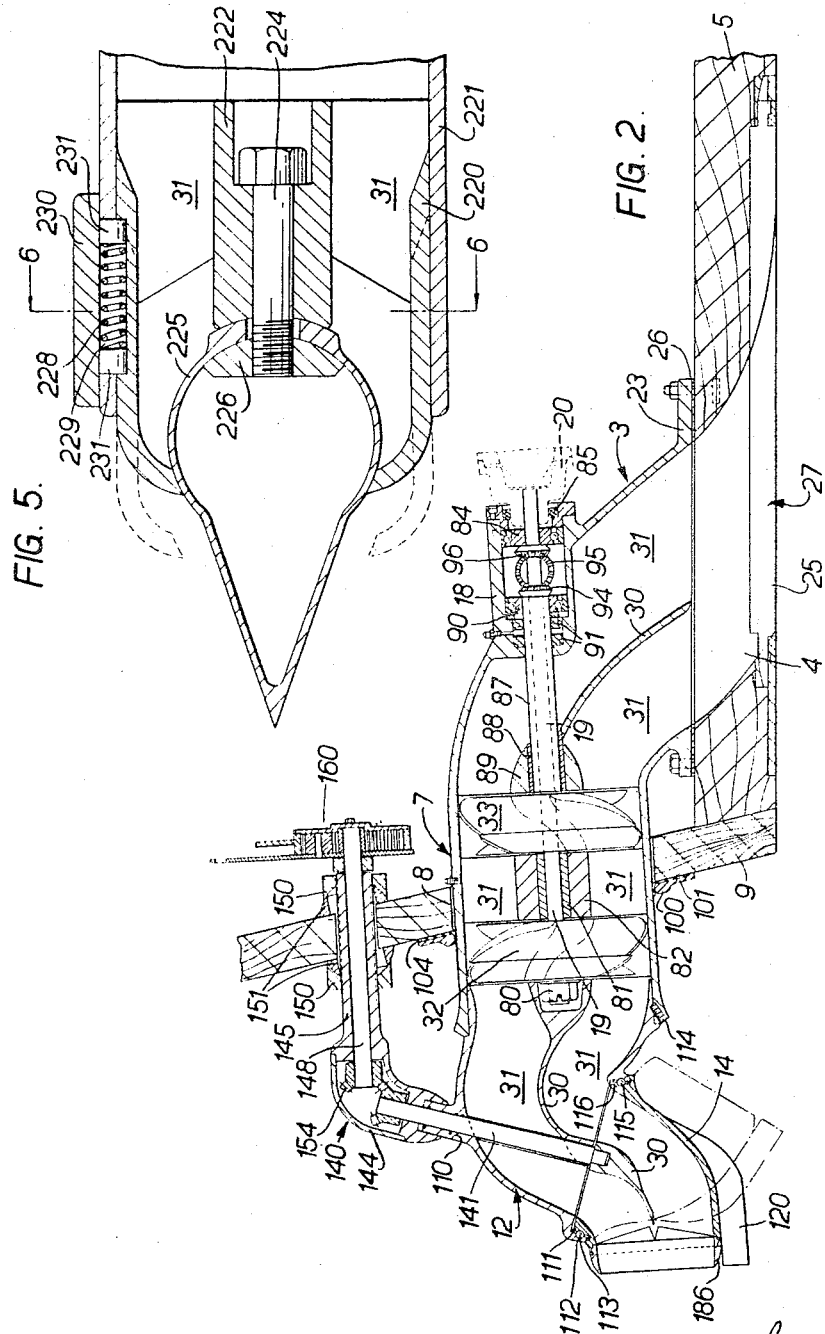

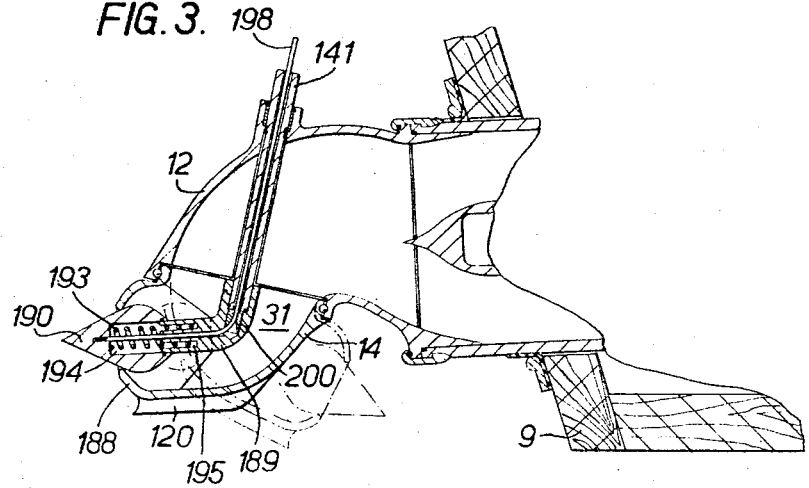
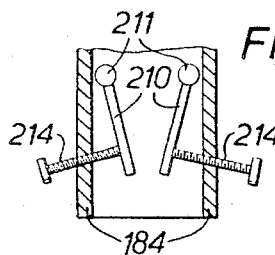
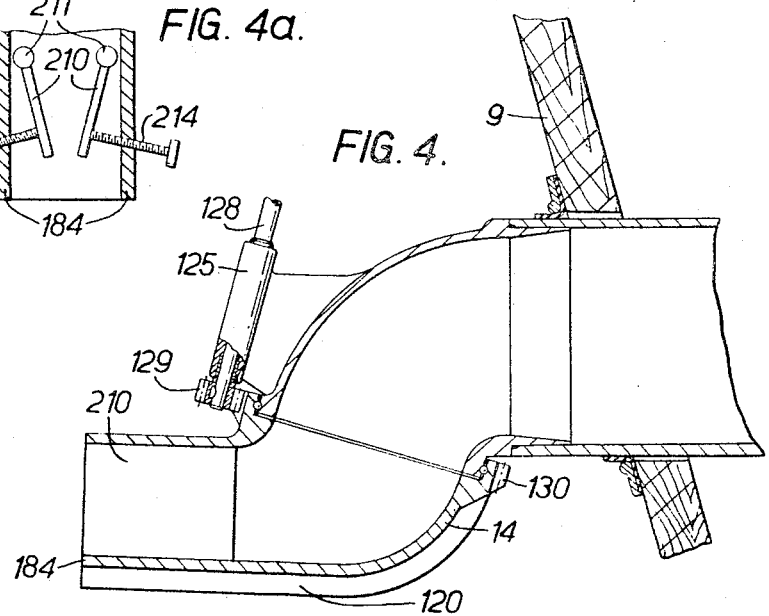

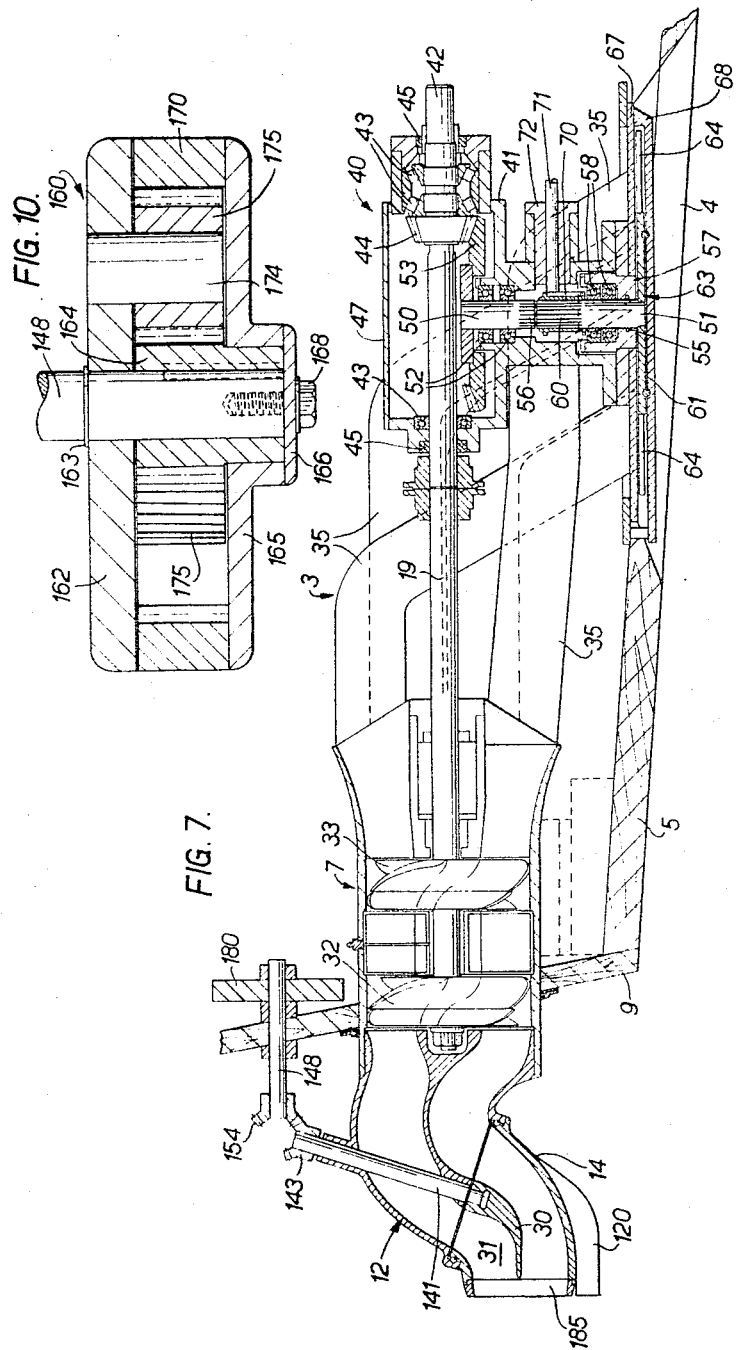

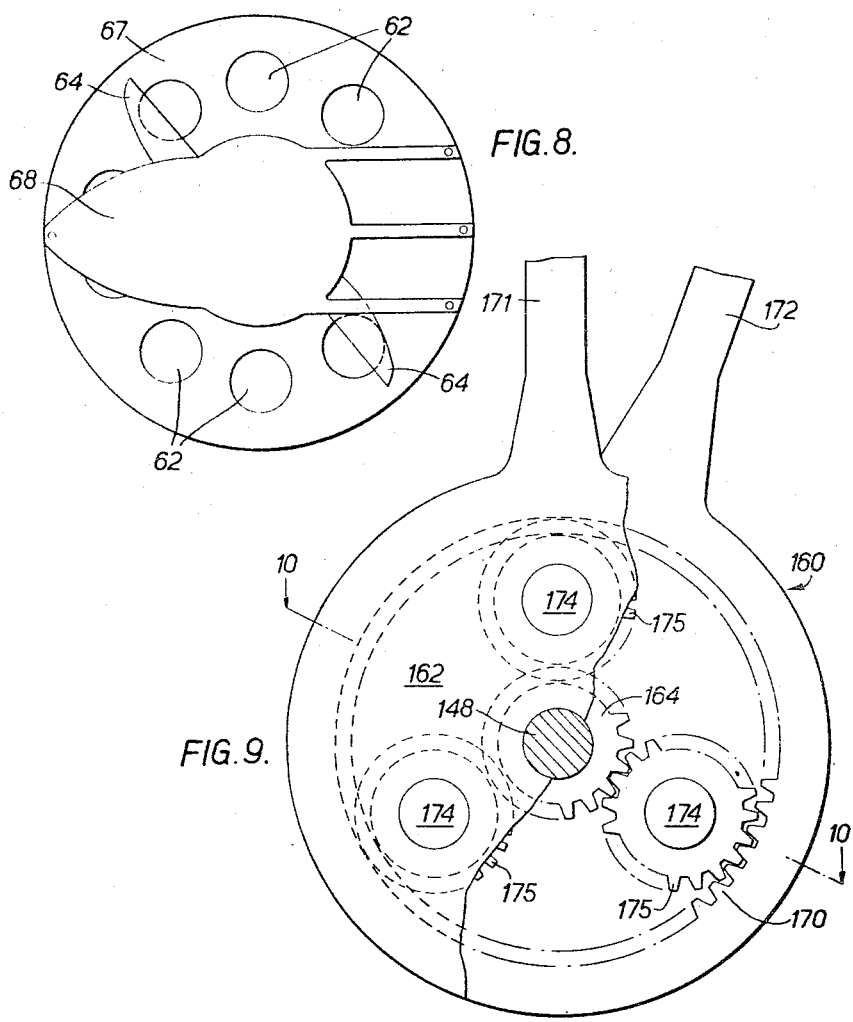

United States Patent Office 3,302,605
Patented Feb. 7, 1967

3,302,605
WATER JET PROPULSION APPARATUS
Siegfried Kuether, c/o Tamco Limited, Gladstone Ave.,
La Salle, Ontario, Canada
Filed Dec. 29, 1964, Ser. No. 421,796
Claims priority, application Canada, Feb. 14, 1964,
895,749
4 Claims. (Cl. 115—12)

This invention relates to a propulsion apparatus for watercraft and more particularly relates to a water jet propulsion apparatus for use in various types of watercraft.

There are a number of commercially available water jet propulsion apparatuses for watercraft and many similar systems for various sorts have been proposed in the past, although few of these have gained any commercial success. These known types of apparatuses, depending upon the particular system being considered, possess various disadvantages which may account for their rather restricted acceptance.

For example, it is well known that one of the major disadvantages of an inboard motor, propeller driven watercraft is that the propeller drive shaft, the drive shaft support strut and the propeller normally project well below the watercraft's keel thus making these parts very vulnerable to damage in shoal water operations. It has been proposed to overcome this disadvantage by substituting for the propeller etc., a water jet propulsion apparatus which draws water through the bottom of the craft and ejects it aft of its transom. This reduced the craft's draft but required rather complex steering arrangements which normally took the form of water-jet deflecting vanes which could be turned to deflect the jet one way or the other depending upon the direction in which the craft was to proceed. Additional deflectors were employed to reverse the jet and thus the craft. This particular form of steering mechanism has in practice proven to be somewhat difficult to render both reliable and reasonably cheap to manufacture.

A further problem which has arisen with known types of water jet propulsion apparatuses has concerned their water intake which is normally located in the bottom of the boat, sometimes aligned with the keel and sometimes off-centre from the keel. The disadvantages of known intakes has been that they frequently drew in all kinds of foreign matter such as weeds, gravel and the like which either damaged the unit or alternatively jammed it. Of course, once a propulsion system of this sort is jammed it can be very difficult to free by reason of the fact that the propellers used in these systems are not readily accessible.

Difficulties have also been encountered in known systems as a result of inefficient operation of the propellers in their housing occurring as a result of severe cavitation. Further problems have also been encountered in the form of difficulties associated with the mounting and aligning of the unit and with the necessity of having to almost "tailor make" a unit to suit a particular boat with its peculiar water thrust jet velocity requirements. If not "tailor made" a unit may operate very inefficiently and thereby cancel out any advantages otherwise gained through its use.

It is the object of this invention to provide a water jet propulsion apparatus for watercraft which through its relatively simple and functional design can be manufactured at a cost competitive with other forms of watercraft propulsion systems and which, depending upon the particular embodiment of the invention utilized, overcomes or reduces many of the above-noted disadvantages associated with known propulsion apparatuses of the water jet type.

Generally speaking the present invention is concerned with a water jet propulsion system which possesses a novel, simple steering mechanism providing increased maneuverability, and which can be simply and readily mounted in a watercraft so as not to project below the craft's keel. Furthermore, the unit's water jet thrust/velocity characteristics can be quickly varied to suit various operating conditions. Also a watercraft utilizing it can be operated in weedy shoal water with very little if any danger of the system drawing in damaging foreign matter such as gravel and weeds. Additionally, the propulsion system of this invention has been found to operate very efficiently thus requiring a minimum amount of power by reason of the novel structure of its propeller and housing. These and other advantages of the propulsion system of this invention will become more apparent upon an understanding of the various embodiments of the invention as disclosed hereinbelow in conjunction with the accompanying drawings wherein like numerals are used to designate like or similar parts and wherein:

FIGURE 1 is a perspective view of a water jet propulsion apparatus constructed in accordance with the present invention mounted in a watercraft shown with parts cut away;

FIGURE 2 is a partially sectioned view in elevation of the propulsion apparatus of FIGURE 1;

FIGURE 3 shows an alternative embodiment of the nozzle arrangement utilized in the apparatus of FIGURE 1;

FIGURE 4 is a partly sectioned view of yet another steering and nozzle arrangement which can be utilized in the propulsion apparatus of FIGURE 1;

FIGURE 4a is a partly sectioned plan view of a modified nozzle arrangement similar to FIGURE 4 but including a variable outlet, and with some parts omitted;

FIGURE 5 is a partially sectioned view in elevation of a water outlet nozzle arrangement which can be utilized as an alternative to those depicted in FIGURES 1, 3, and 4;

FIGURE 6 is a sectional view taken along the line 6—6 of FIGURE 5;

FIGURE 7 is a partially sectioned view in elevation of an alternative embodiment of the water jet propulsion apparatus of this invention which, being provided with a manifold intake and weed cutting attachment, is particularly suitable for use in shoal, weed infested waters;

FIGURE 8 is a bottom view of the cutter and intake arrangement only, other parts being removed, utilized in the weed cutting attachment shown in the apparatus illustrated in FIGURE 7;

FIGURE 9 is a view in elevation with parts broken away of one form of steering control mechanism for the water jet propulsion apparatus of this invention.

FIGURE 10 is a section taken along the line 10—10 of FIGURE 9;

Figure 11:
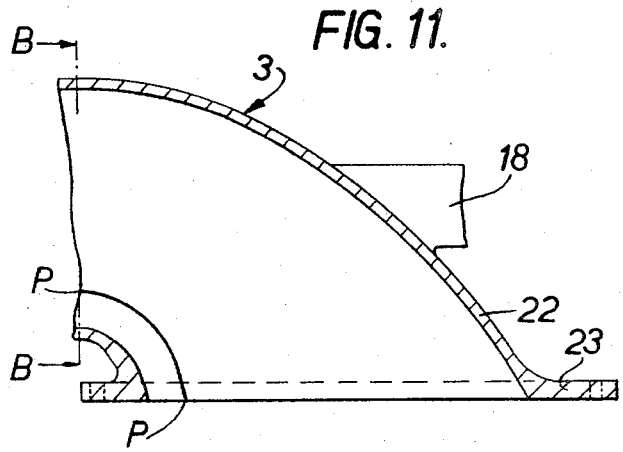
Figure 11A:
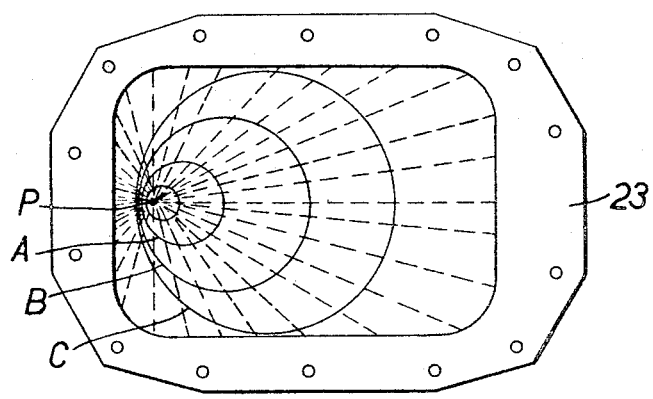
Figure 11B:
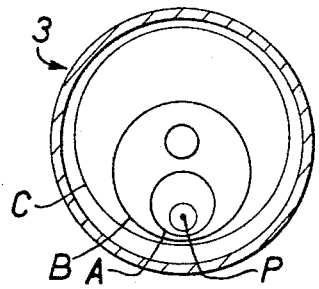
Figure 12:
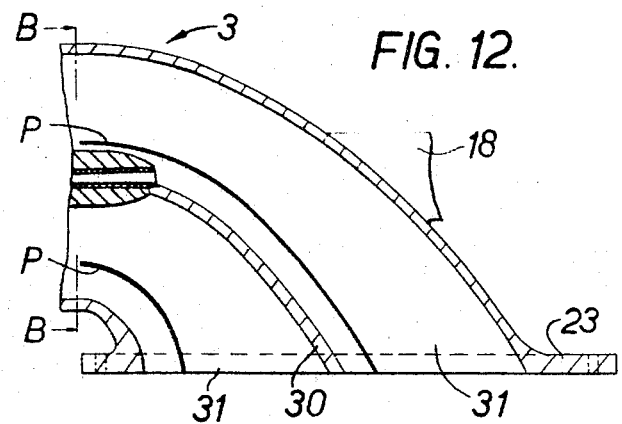
Figure 12A:
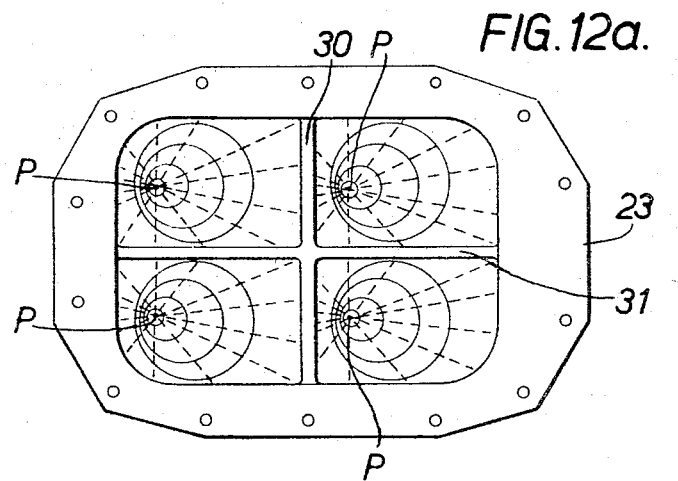
Figure 12B:
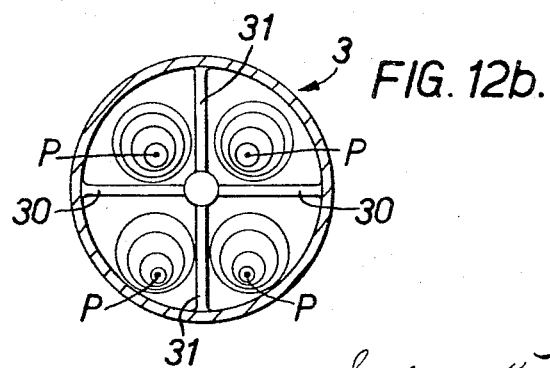

FIGURE 11 is a sectional view in elevation, 11a a bottom view, and 11b a section along the line B—B of FIGURE 11, showing known water intakes for water jet propulsion apparatuses, these figures including intake water velocity patterns; and FIGURES 12, 12a and 12b are views corresponding to FIGURES 11, 11a and 11b of one form of water intake according to the present invention also including intake water velocity patterns.

GENERAL DESCRIPTION

Referring to FIGURES 1, 2 and 7 it will be seen that the water jet propulsion apparatus of this invention generally referred to by the numeral 1 is shown mounted in a watercraft generally referred to by the numeral 2 and includes a water intake elbow portion 3 secured over an opening 4 in the watercraft's bottom planking 5 and a cylindrical propeller housing 7 located at the outlet end of intake housing 3 and passing through a circular aperture 8 in the craft's transom 9. The propeller housing 7 is cast integrally with the water intake portion 3 in the embodiment illustrated in FIGURES 1 and 2 although such is not so in the embodiment illustrated in FIGURE 7. Outlet nozzle and steering apparatus generally referred to by the reference numeral 11 is secured to the outboard, outlet end of the propeller housing 7 and generally consists of a first downwardly discharging cast elbow 12 having its inlet end secured to the outboard end of the propeller housing 7. To its outlet end is rotatably secured a second elbow 14 whose outlet end can be provided with various types of nozzle arrangements. Means for rotating the elbow 14 to thereby steer the watercraft are contained within the elbows 14 and 12 as well as within the steering mechanism housing 16 clearly shown in FIGURE 1.

A drive shaft housing 18 projects from the forward end of the water intake portion 3 with which it is integrally cast and a drive shaft 19 passes through the housing 18 and has secured to its outboard end a known type of universal joint 20. The drive shaft of a suitable marine engine (neither of which are shown) is connected to the universal joint 20.

DETAILED DESCRIPTION

Water intake portion of apparatus

Depending upon the environment which the apparatus is expected to operate in, such as deep water, shoal water, weedy water, etc., various forms of water intakes can be employed with the simples being that shown in detail in FIGURES 1, 2, 12, 12a and 12b wherein the water intake portion 3 of the apparatus consists of an elbow-shaped structure integrally cast with the propeller housing 7 and provided on its intake end with a mounting flange 23 which encircles opening 4 and which is apertured to receive a plurality of mounting bolts 24 which are used to secure the intake portion 3 to the bottom planking 5 of the craft 2. A gasket 26 located between the flange 23 and the planking 5 is provided to ensure an air and water-tight seal between the planking and the flange. An intake screen 27 is secured over the intake side of the opening 4 to prevent the entrance of any large foreign material into the apparatus during operation. This screen can be of any form, that depicted consisting of a plurality of longitudinally extending, spaced parallel bars 25, some of which are secured by bolts 24 against the bottom planking of the craft which is thereby clamped between the flange 23 and bars 25. The other bars 25 are secured by suitable fastening means such as screws.

Located within the water intake portion 3 are longitudinally extending mutually perpendicular and substantially mutually bisecting webs 30 and 31 (see FIGURE 12a) which divide the interior of the water intake portion 3 and as will be noted hereinafter, the remainder of the water flow path through the apparatus, into four sectors which among other things, aid in evenly distributing the intake water to propellers 32, 33 located within the propeller housing 7.

As shown in FIGURES 11, 11a and 11b in the event that a water intake portion 3 is utilized which does not include webs 30 and 31 it has ben found that during operation of the water jet propulsion apparatus the velocity of the intake water is at a mafimum at point P in FIGURES 11a and 11b, and along the line P—P in FIGURE 11. Circles A, B and C considered in junction with the broken lines radiating from point P in in FIGURE 11a show the water intake volocity pattern of the particular form of intake arrangement shown in FIGURES 11, 11a and 11b.

Where a craft is operated in deep water this particular known form of intake is reasonably effective except that it is inefficient by reason of the fact that intake water is not at all evenly distributed over the intake side of the propeller 33. However, where the watercraft is to be operated in shoal draft water over gravel it has been found that this form of intake as a result of its particular water intake velocity pattern sucks in gravel and other foreign material even when the gravel is located a number of feet away from the intake.

Referring now to FIGURES 12, 12a and 12b, it will be seen that when webs 30 and 31 are provided within the water intake portion 3 maximum intake water velocities occur at points P and along line P—P, the velocity patterns also being shown. It has been found that for any given amount of water flowing through the apparatus during use the maximum intake water velocity at any of the points P in FIGURE 12a will be approximately one-quarter of the velocity at point P in FIGURE 11a and as a result the apparatus will suck in much less foreign material during use in that the intake water velocity even at its point of maximum velocity is substantially reduced over what it is if the construction shown in FIGURES 11, 11a and 11b is utilized. Also, if additional webs are utilized to further increase the number of sectors into which the water flow path is divided, the apparatus may be operated with its intake located only a few inches from the gravelly bottom of a body of water without drawing in any foreign material large enough to damage it.

Referring to FIGURE 7 it will be seen that an alternative form of water intake portion 3 has been provided which comprises a manifold consisting of a plurality of suitably bent, round water intake pipes 35 which can be considered equivalent to a single, divided intake as described above when considering intake water velocities. In certain embodiments of the invention this arrangement has been found to possess certain advantages over the form of intake shown in FIGURES 1, 2, 12, 12a and 12b particularly when it is necessary to employ a weed cutter on the apparatus as generally referred to by the reference numeral 40 in FIGURE 7. Water intake pipes 35 may be formed from flexible tubing such as that formed from polyethylene. In this event, the intake and outlet ends of the pipes 35 would be fitted over suitably shaped and sized nipples to which the pipes would be clamped by means of suitable hose clamps. Such an arrangement would be particularly suitable for use in installations where the water intake for the propulsion apparatus was to be located some distance away from the remainder of the apparatus. Also such an arrangement is relatively inexpensive as compared with preshaped manifolds formed by bending metal tubing or by casting processes.

Weed cutting attachment

Referring to FIGURE 7, the weed cutting attachment 40 which is located over the opening 4 in the bottom planking 5 and which is adapted to constitute an integral part of the particular embodiment of the illustrated water jet propulsion system, consists of a substantially cylindrical, multi-diameter, T-shaped housing 41 through which horizontal drive shaft 42 passes, shaft 42 being journalled in the housing on bearings 43 and having secured to it a bevel gear 44. Oil seals 45 are provided where shaft 42 passes through the housing 41. An inspection plate 47 is secured to the top of housing 41 above shaft 42 and gear 44.

Also located within housing 41 are a pair of coaxial, vertical, weed cutter drive shafts 50 and 51. Drive shaft 50 which is journalled in a pair of bearings 52 mounted in housing 41 has a bevel gear 53 secured to its upper end with gear 53 being meshed with gear 44 and the shaft's lower end is splined at 56. Drive shaft 51 is journalled in a pair of bearings 58 mounted in a sleeve 57 which is fitted and secured in the lower open end of the housing 41 and in which is mounted a seal in the form of an O-ring 55. The upper end of drive shaft 51 is splined at 60 and its lower end has a weed cutter 63 secured to it, the cutter consisting simply of a flat disc 61 which is centrally apertured to receive shaft 51, and a pair of radially opposed knives 64 secured to its periphery.

Disc 61 and knives 64 rotate between a pair of parallel, spaced, plate-like members 67 and 68 secured to the lower end of housing 41 and suitably apertured to permit water to flow through them into water intake pipes 35.

Referring to FIGURE 8, plate 67 is circular and is provided with a plurality of water intake openings 62 leading to water intake pipes 35. Plate 68 has a circular centre portion, a forwardly directed arrowhead-shaped portion and three rearwardly directed, parallel legs. The purpose of this arrangement is to permit maximum water access to openings 62 while, in conjunction with the specially shaped knives 64, providing a "scissors" action between the plate 68 and a respective knife 64 (the knives rotating counterclockwise as viewed in FIGURE 8), which will tend to throw objects which cannot readily be cut away from the intake openings 62 and will also reduce the possibility of jamming the knives during operation.

An axially slidable, interiorly splined, rotatable sleeve 70 is provided within housing 41 on splines 60. Sleeve 70 can be slidably moved along splines 60 by means of an actuating rod 71 journalled in a sleeve 72 mounted in housing 41, to engage splines 56 on shaft 50 thereby to rotate disc 61 and knives 64 and thus render the weed cutter optionally operative during operation of the water jet propulsion apparatus. It will be appreciated that other forms of clutches could be utilized to render the operation of the weed cutter optional and the clutch mechanism could also be dispensed with if it was necessary to have the weed cutting apparatus operative whenever the propulsion apparatus was operative.

It will be appreciated that during operation of the weed cutter any weeds drawn into the apparatus' intake will be finely cut up as a result of the shearing action of the knives 64 against the apertured plate 67 to permit the weeds to pass through the apparatus without doing any harm.

*Water propelling means*

In its simplest form the water propelling means utilized in the apparatus of this invention can consist of a single multi-bladed propeller located within the propeller housing 7. However, considering each propeller as being one stage, the normal practice is to use either a two-stage or a three-stage arrangement with the two-stage arrangement being found the most satisfactory in most applications. Referring to FIGURE 2 it will be seen that a two-stage arrangement is illustrated. This arrangement is such that one propeller 32 is driven in one direction and the other 33 is driven in the opposite direction. In other words, the propellers are "handed."

Propeller 32 is mounted within cylindrical housing 7 on the drive shaft 19 to which it is keyed and further secured by a nut 80 threaded on the left-hand end of shaft 19 in FIGURE 2. Shaft 19 is journalled in a bearing 81 which is secured within a cylindrical hub 82 which is cast integrally with webs 30 and 31 so as to be coaxial with cylindrical housing 7. The other end of shaft 19 is journalled in a bearing 84 located within drive shaft housing 18. An oil seal 85 is provided to prevent lubricant from leaking out of housing 18.

Propeller 33 is keyed to a hollow drive shaft 87 which is coaxial with and encircles shaft 19. Shaft 87 is journalled in a bearing 88 mounted in a hub 89 centrally positioned in housing 7 by means of webs 30 and 31 with which it is integrally cast. The other end of shaft 87 is journalled in a bearing 90 located within housing 18 and oil and water seals 91 are provided in housing 18 between bearing 90 and the interior of the water intake portion 3.

The end of shaft 87 located remote from propeller 33 is provided with a bevel gear 94 which is meshed with a pair (only one shown) of bevelled, contra-rotatable idler gears 95 which in turn are meshed with a bevel gear 96 fixed to shaft 19. With this arrangement rotation of shaft 19 and its associated propeller 32 in one direction will cause rotation of shaft 87 and its associated propeller 33 in the opposite direction. The advantage of using contra-rotating propellers is that rotational movement in one direction imparted to the incoming water by the first propeller will be cancelled out by the second propeller thereby improving the operational efficiency of the apparatus.

In the event that it is not considered necessary to use contra-rotating propellers then the arrangement described above for driving the propellers could be very much simplified in that the gears contained within housing 18 could be dispensed with and only a single drive shaft would be required with this shaft being journalled in each of hubs 89 and 82 and having both propellers 32 and 33 keyed to it. Such an arrangement is shown schematically in FIGURE 7 wherein only one drive shaft 19 is utilized and both propellers which would normally be identical are keyed to it.

The actual type of propeller employed will depend upon many conditions. Normally a three or four bladed propeller is employed. It has been found that in spite of the existence of webs 30 and 31 situated behind the trailing edges of each of the propellers as water straighteners, a substantial amount of cavitation occurs and a substantial amount of turbulence results adjacent the trailing edges of the propellers. It has been further discovered that the trailing edge turbulence can be reduced to a substantial extent by utilizing the type of propeller illustrated in FIGURE 2 which is split transversely approximately two-thirds of the distance back from its leading edge and the resulting two portions of the propeller are slightly off-set when the propeller is keyed to its shaft so that the leading edge of the rear portion of the propeller is slightly in advance of the trailing edge of the forward portion of the propeller when the propeller is rotating in its normally operative direction.

This particular form of propeller is found particularly useful when the utmost in efficiency is required.

*Mounting*

As previously indicated, the water jet propulsion apparatus of this invention is secured to the watercraft's bottom planking by means of a plurality of bolts 24 which pass through a mounting flange 20 provided at the inlet end of the water intake portion 3 of the apparatus. It has been found that the apparatus need not be otherwise directly secured to the watercraft if the arrangement illustrated in FIGURES 1 and 2 where the propeller housing passes through the transom 9 is employed. This arrangement which has proven to be very simple and reliable consists of a ring 100 which encircles the propeller housing 7 and which is provided with an apertured flange 101. Screws or bolts 102 pass through the apertures in flange 101 and secure the ring 100 to the transom 9 with a flexible, flat annular gasket 104 having, when mounted as shown, an L-shaped cross-section located between the base of the ring 100 and the transom and also between the ring and the propeller housing. Gasket 104 is normally cut so as to have an inner diameter which is less than the diameter of the propeller housing 7 so that when the gasket is drawn over the housing prior to mounting the propulsion apparatus in a boat, a water-tight seal is provided between the gasket and the housing. This arrangement provides a vibration reducing, leak-proof, simple self-aligning arrangement which makes it very easy to mount the apparatus of this invention in any suitable watercraft.

Steering apparatus

As previously indicated in the general description the outlet end of the propeller housing 7 has a downwardly directed elbow 12 secured to it by any suitable means such as for example the arrangement shown in FIGURE 2 where the inlet end of elbow 12 mates within the outlet end of housing 7 and is simply maintained in position by a plurality of radially spaced screws 114, only one shown, threaded into the outlet end of the housing and engageable with sockets in the inlet end of elbow 12.

Looking at FIGURES 1, 2, and 7, one general form of elbow 12 is shown provided with webs 30 and 31 and also with an integral, apertured, upwardly directed, cylindrical boss 110. The outlet end of elbow 12 is provided with a circular socket 111 which is grooved at 112 to receive balls 113 which fit in a circular groove 115 located in the cylindrical wall 116 provided at the inlet end of the elbow 14, the balls 113 rotatably locking the elbow 14 to the outlet end of elbow 12 to permit 360° rotation of the elbow 14. The balls are placed in position during assembly by passing them through an access hole (not shown) into the grooves. The access hole is then plugged. It will be noted that the plane of rotation of elbow 14 is an angle to the horizontal so that when elbow 14 is turned so as to direct a water jet in a forward direction the water jet will be directed below the bottom of the watercraft but on the other hand when the elbow 14 is rotated so as to discharge the jet dead astern the lowest extremity of elbow 14, which consists of a small rudder blade 120 does not project below the bottom edge of the transom 9. Thus there is provided a very simple steering arrangement which can be readily and inexpensively fabricated and which avoids the disadvantage of having any portion of the jet propulsion apparatus projecting below the bottom of the watercraft and avoids the use of separate deflectors.

One of the simplest forms of arrangements which can be utilized for rotating elbow 14 is illustrated in FIGURE 4 wherein there is shown a cylindrical shaft housing 125 integrally connected to elbow 12 through the intermediary of a web 126.

Journalled in housing 125 is a shaft 128 to whose lower end is fixed a gear 129 which is in constant mesh with a ring gear 130 cast integrally about the inlet end of elbow 14.

The upper end of shaft 128 can be provided with any form of arrangement whereby rotary motion may be transmitted to shaft 128 from the watercraft within which the propulsion unit is mounted.

Such an arrangement is shown in detail in FIGURE 2 and is generally referred to by the reference numeral 140. However, in this arrangement the shaft 128, pinion gear 129 and ring gear 130 are replaced by a shaft 141 whose lower end passes through elbow 12 and is centrally secured to the inlet end of elbow 14 within a socket in an expanded portion of web 30 in the elbow 14, and whose upper end passes through boss 110 in which it is journalled and has secured to it a bevel gear 143 located within an elbow-shaped housing 144 which constitutes part of the steering mechanism housing 16. The lower end of housing 144 fits over boss 110 and its upper end is provided with a forwardly directed projection 145 which passes through the transom 9 of the craft above the propeller housing 7. A water-tight seal will normally be provided between projection 145 and transom 9 by means of nuts 150 threaded on projection 145 and abutting against semispherical self-aligning sealing members 151.

A horizontal extending shaft 148 passes through cylindrical projection 145 within which it is journalled. The outboard end of shaft 148 has secured to it a bevel gear 144 which matches bevel gear 143 with which it is in constant mesh and the inboard end of shaft 148 is provided with a steering control generally referred to by the numeral 160 and illustrated in detail in FIGURES 9 and 10 to which reference is now made.

The purpose of this particular steering control is to provide one lever, the reverse lever, whose movement through a short arc will cause rapid rotation of elbow 14 through 180° and to provide another lever, the steering lever, which will permit fine steering control of elbow 14 once positioned in its generally forward or generally reverse direction by the reverisng lever. In FIGURES 9 and 10 shaft 148 is journalled in a cylindrical plate 162, the plate and shaft being maintained in their proper relative positions by means of a split ring 163 and to the inboard end of shaft 148 is keyed a gear 164. A cylindrical plate 165 which is substantially T-shaped in cross-section, is provided with a cap 166 rotatably secured to the end of shaft 148 by means of bolt 168 which passes through the centre of cap 166 and threads into the centre of the end of the shaft 148. A ring gear 170 is concentrically secured to housing 165. A reverse lever 171 is secured to plate 162 and a steering lever 172 is secured to plate 165. The plate 162 has three identical sub shafts 174 equally spaced about a circle concentric with plate 162 secured to it with each of these shafts projecting from the inside surface of the plate. Rotatably mounted on each of stub shafts 174 are identical gears 175 which constantly mesh with both ring gear 170 and gear 164. The operation of this device is as follows.

When it is desired to rotate elbow 14 through 180° in order to cause the craft to reverse the steering lever 172 is held motionless and the reverse lever 171 rotated either clockwise or anti-clockwise depending upon which way it is desired to rotate elbow 14. The rotation of lever 171, while lever 172 and its relatively fixed ring gear are held motionless, will cause rotation of gears 175 and their stub shafts and of gear 174 which will cause rotation of elbow 14 through 180°. With this arrangement it is not necessary to move reverse lever 171 through a 180° arc in order to achieve the required 180° rotation of elbow 14, this being a significant advantage of this simple steering arrangement.

When steering the watercraft, fine control of elbow 14 is achieved by keeping the reverse arm 171 stationary while moving the steering arm 172 through the desired degree of rotation depending upon the direction in which it is desired to steer the watercraft. When the reverse lever 171 is held stationary and steering arm 172 is rotated, ring gear 170 is rotated, gears 175 rotate but the stub shafts 174 do not as they are secured to plate 162 which is held stationary and, therefore, the rotational movement transferred from the ring gear to gears 175 passes to gear 164 and to shaft 148 thus achieving a fine steering control.

It will be appreciated that steering and reverse levers 172 and 171 respectively may be remotely controlled by suitable linkages or may be directly controlled manually from the stern of the boat, it being the normal practice to utilize remote controls to enable the helmsman in the craft to sit in a forward position.

Referring to FIGURE 7, it will be seen that a steering arrangement possessing similarities to that illustrated in FIGURE 2 but of a somewhat simpler structure is illustrated. Without describing the structure in detail it will be seen that it also includes a shaft 141, gears 143 and 154 which are not housed, and a shaft 148 which passes through transom 9 and to whose inboard end is secured a wheel 180 which functions as both a steering and reverse control.

Discharge nozzle arrangement

Various forms of water jet discharge nozzle arrangements can be provided on the outlet end of elbow 14 depending upon the particular requirements of the propulsion apparatus. The simplest nozzle arrangement is that shown in FIGURE 4 of the drawings wherein the nozzle consists of nothing more than a straight, rectangular outlet extension 184 cast integrally with elbow 14. A similar arrangement is shown in FIGURE 7 although here the outlet nozzle consists of an annular nozzle 185 which is threaded to the outlet end of elbow 14. A further similar arrangement is illustrated in FIGURE 2 wherein an annular nozzle 186 is threaded to the outlet end of elbow 14. It will be appreciated that nozzles 185 and 186 can be of varying diameters and interchangeable depending upon the thrust velocity required.

It will be appreciated that depending upon the particular application to which a propulsion unit constructed in accordance with the present invention is to be put there will be some where a high thrust, low velocity water jet will be most suitable and other applications where a high velocity, low thrust jet will be most suitable and other applications where a high velocity, low thrust jet will be suitable. Also in some instances it will be desirable to be able to vary the water jet thrust/velocity during operation of the propulsion unit such as for example, when starting up a planing hull high thrust will be required until planing velocity is reached and thereafter less jet thrust and greater velocity will be required to achieve maximum craft speed.

In FIGURE 4a there is shown a modification of the outlet nozzle of FIGURE 4 which enables the outlet nozzle to be adjusted to thereby control the outlet nozzle area. The arrangement shown includes a pair of deflectors 210 hinged at their leading edges on vertical pins 211 which are secured to the top and bottom walls of nozzle 184. The deflectors 210 are manually adjustable to vary the outlet nozzle arrangement by means of bolts 214 which are threaded in respective side walls of nozzle 184.

The nozzle arrangement illustrated in FIGURE 3 permits manual adjustment from within the watercraft of the thrust/velocity during operation of the propulsion unit.

In FIGURE 3 elbow 14 includes an integrally cast nozzle 188 and also includes an integrally cast longitudinally apertured, elbow 189 having a conical nozzle plug 190 coaxially mounted on the horizontal leg of elbow 189 so as to be slidingly movable between a first position as shown in FIGURE 3 where the nozzle 188 is completely closed off and a second position shown in dotted lines where the nozzle 188 is substantially entirely open. A coil spring 193 having one end located within a socket 194 in plug 190 and its other end located in a circular groove 195 in the horizontal leg of elbow 189, continuously urges plug 190 into its nozzle-closing position as illustrated. To remove nozzle 190 from its nozzle-closing position a flexible, nozzle adjusting cable 198 has one end secured to plug 190 at the base of its socket 194 and passes through elbow 189 wherein it is guided by guides 200 and upwardly through steering shaft 141 which is provided with a longitudinally extending bore and thence into the watercraft in any suitable manner (not shown), where it would normally be connected to a simple lever arrangement (not shown).

It will be appreciated that through actuation of cable 198 it is possible to place plug 190 anywhere between its nozzle-closing position and its nozzle fully-open position so as to achieve the required balance between water jet velocity and thrust. The arrangement provided is very simple in construction, reliable in use and permits the propulsion apparatus' operator to operate it at optimum conditions bearing in mind that in addition to the control provided by this nozzle arrangement, water jet velocity and thrust control can also be achieved to a certain extent by varying the r.p.m. of the engine utilized to rotate the propellers 32 and 33.

FIGURES 5 and 6 show an alternate nozzle arrangement which is provided with a self-adjusting outlet area control which consists of a cylindrical sleeve 220, slidably mounted within cylindrical nozzle 221 provided with webs 31 which support a centrally located cylindrical member 222 through which a bolt 224 passes with its threaded, rearwardly directed end having a plug 225 fixed to it by means of a suitably shaped nut 226. Plug 225 is substantially spherical in shape with a cone shaped portion projecting rearwardly from it.

Sleeve 220 is biased in a nozzle closing position by means of three coil springs 228 seated in longitudinally extending pockets 229 which are cut through the walls of nozzle 221 and into but not through the wall of sleeve 220. Slidably movable plugs 231 are provided between each end of each of the springs 228 and its respective end of the spring's pocket 229 to ensure smooth operation of the nozzle arrangement. Cover plates 230 are secured over each of the pockets 229 and its spring 228 to maintain these parts in their operative position.

In operation, when the propulsion apparatus is started a minimum water pressure will be required to open the nozzle, this depending upon the tension of the springs 228 and as water pressure on the sleeve 220 is increased the nozzle will continue to open to a maximum open position shown in dotted lines in FIGURE 5. This arrangement can be designed for any particular unit to provide the most advantageous velocity/thrust characteristics for any particular installation. Also it will prevent "creep" at low engine r.p.m. with the propulsion apparatus' propellers turning as it will prevent water flow through the system.

In summary a water jet propulsion apparatus has been provided which is basically very simple in structure and can be readily adapted to operate efficiently when installed in a wide variety of watercraft.

I claim:

1. A water jet propulsion unit for watercraft comprising a housing having an inlet end and an outlet end adapted for mounting within said craft and an impeller rotatably mouted within said housing; water intake means for delivering water to said impeller inlet comprising a subdivided conduit open at one end, via the hull of said craft, to ambient water and connected at the other end to said housing inlet in such a manner that inflow in said conduit terminates at said impeller substantially coaxially with the rotational axis thereof; a water exhaust connected to the outlet end of the impeller housing and adapted to extend outwardly from the transom of said hull to provide directional thrust to said craft, said exhaust including an elbow-shaped nozzle rotatably and angularly mounted with respect to the longitudinal axis of said unit for passing rearward thrust substantially parallel to said longitudinal axis and forward thrust below said unit and craft, said nozzle being positioned co-planar with or above the lower surface of said hull.

2. A water jet propulsion unit according to claim 1 wherein the impeller includes blades disposed substantially normal to the terminating inflow of water in said inlet and the subdivision of the latter including mutually bisecting webs extending the length of said conduit to provide a plurality of fluid velocity concentration points coaxial with the rotational axis of the impeller and to more evenly distribute said water over the area of said impeller.

3. A water jet propulsion unit according to claim 1 wherein said sub-divided conduit consists of a plurality of separate intake pipes congregated at one end to form said inlet and at their other ends being circumferentially disposed about the intake end of said impeller housing.

4. A water jet propulsion unit according to claim 1 including weed cutting means comprising a pair of plate members mounted in juxtaposition at the hull end of the water intake means and being substantially coplanar with the longitudinal axis of the unit, a disc mounted for rotation between said plate members; a plurality of knife blades extending radially from said disc; and apertures in said plate members to allow the inlet of water into said intake conduit.

References Cited by the Examiner
UNITED STATES PATENTS

| | | | |
|---|---|---|---|
| 2,024,274 | 12/1935 | Campini | 115—16 |
| 2,149,155 | 2/1939 | Anderson | 115—12 |
| 3,046,735 | 7/1962 | Burgin | 60—35.55 |
| 3,090,346 | 5/1963 | Burgin | 115—12 |
| 3,128,740 | 4/1964 | Burgin | 115—12 |
| 3,143,857 | 8/1964 | Eaton | 115—12 X |

FERGUS S. MIDDLETON, *Primary Examiner.*

ANDREW H. FARRELL, *Examiner.*